(No Model.) 2 Sheets—Sheet 1.
Z. H. MANGUM.
MACHINE FOR UNWINDING WARP THREADS.
No. 605,965. Patented June 21, 1898.
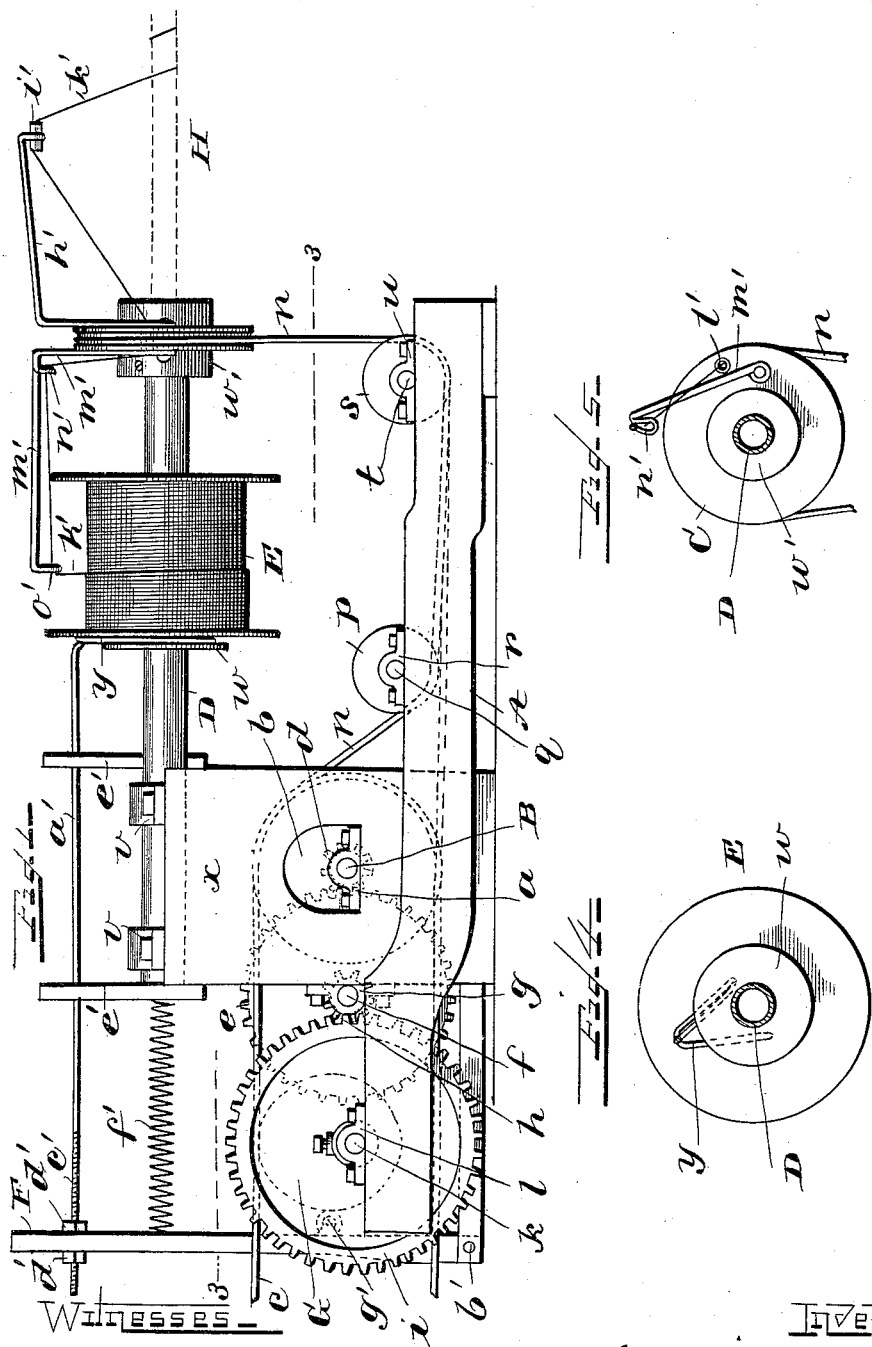

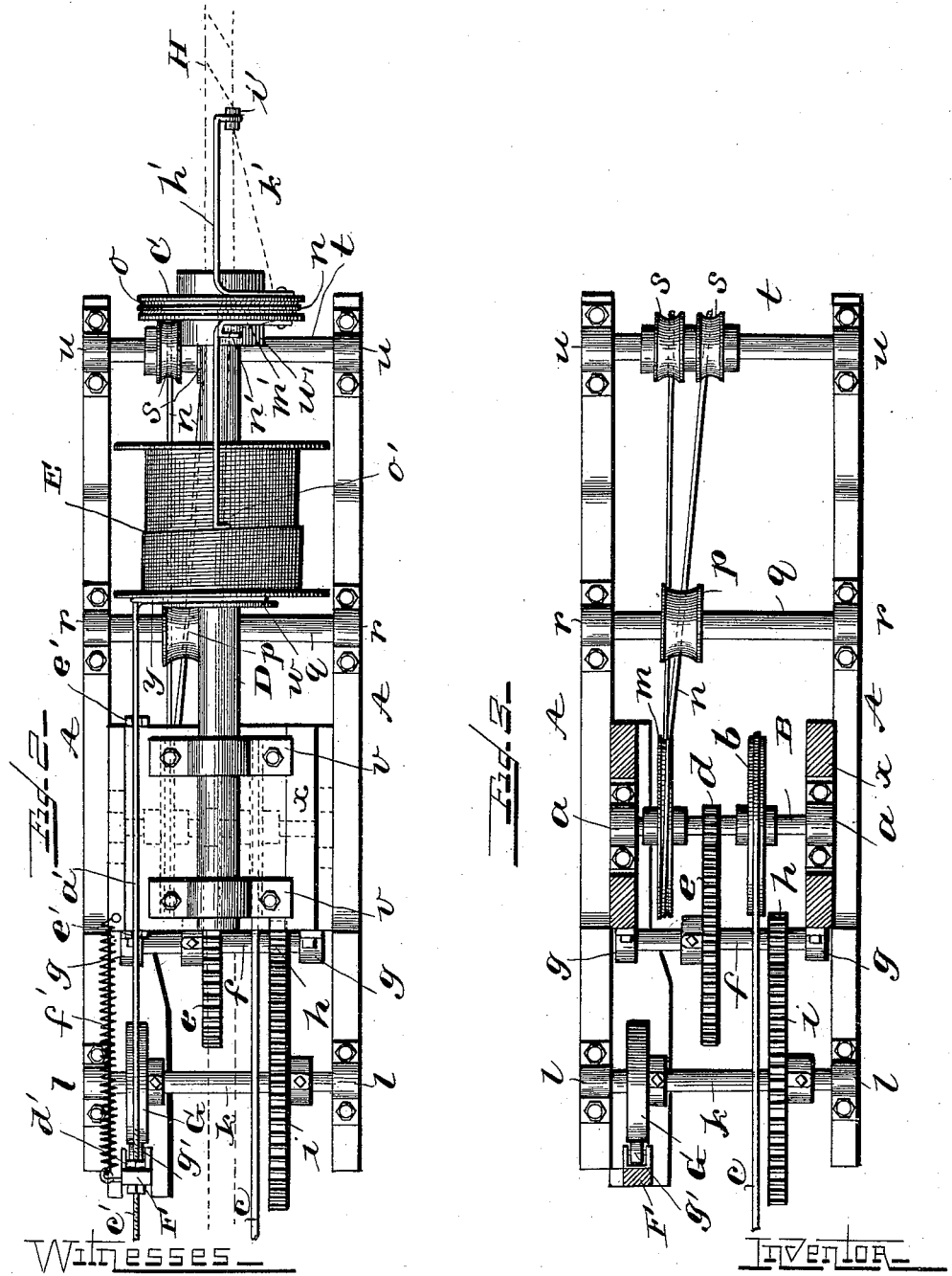

UNITED STATES PATENT OFFICE.

ZEBULON H. MANGUM, OF CHESTER, SOUTH CAROLINA.

MACHINE FOR UNWINDING WARP-THREADS.

SPECIFICATION forming part of Letters Patent No. 605,965, dated June 21, 1898.

Application filed December 27, 1897. Serial No. 663,604. (No model.)

*To all whom it may concern:*

Be it known that I, ZEBULON H. MANGUM, a citizen of the United States, residing at Chester, in the county of Chester and State of South Carolina, have invented certain new and useful Improvements in Machines for Unwinding Warp-Threads; and I do hereby declare the following to be a full, clear, and exact description of the invention, such as will enable others skilled in the art to which it appertains to make and use the same.

My invention relates to textile machinery, and has especial reference to mechanisms for unwinding the warp-thread from a chain after it has passed through the process of boiling, dyeing or bleaching, drying, &c., preparatory to its being beamed or quilled; and it consists in certain improvements in construction, which will be fully disclosed in the following specification and claims.

In the accompanying drawings, which form part of this specification, Figure 1 represents a side elevation of my invention; Fig. 2, a top plan view; Fig. 3, a like view on line 3 3 in Fig. 2; Fig. 4, an end view of the inner end of the spool, and Fig. 5 a like view of the unwinding-head.

Reference being had to the drawings and the letters thereon, A indicates the frame of the machine; B, the driving-shaft, supported in journal-bearings $a$ $a$ and provided with a pulley $b$, with which the driving-belt $c$ engages and communicates power from any suitable source. (Not shown.) A pinion $d$ on said shaft transmits motion to a gear-wheel $e$ on shaft $f$, supported in journal-bearings $g$ $g$, and a pinion $h$ on shaft $f$ engages a gear-wheel $i$ on shaft $k$, supported in journal-bearings $l$ $l$.

On shaft B is a pulley $m$, with which a belt $n$ engages and with a groove $o$ in the periphery of the revoluble unwinding-head C, and said belt engages a revoluble tightener $p$ on shaft $q$, supported in bearings $r$ $r$ and two idlers $s$ $s$, situated below the head C and mounted on shaft $t$, supported in bearings $u$ $u$.

D indicates a stationary tube supported upon the vertical projection $x$ of the frame at one end of the tube and in the transverse center of the frame in any suitable manner, such as by clamps $v$ $v$, and upon said shaft is a non-revoluble spool or yarn-receiver E, which is longitudinally movable thereon to lay the yarn evenly on the spool. The spool is provided at its inner end with a flange $w$, between which and the spool a yoke $y$ is inserted. The yoke is on the end of a rod $a'$, which extends to and is adjustably secured to a vertical and vibratory arm or lever F, which is pivotally secured to the frame at its lower end, as indicated at $b'$. The outer end of the rod is screw-threaded at $c'$ and engages the lever F, as shown in Figs. 1 and 2, and is provided with nuts $d'$ $d'$ for varying the length of the rod and the extent of longitudinal movement of the spool E.

The rod $a'$ is supported in posts $e'$ $e'$, and between the arm or lever F and the vertical projection $x$ of the frame a helically-coiled spring $f'$ is inserted, the tension of which spring is exerted upon the yoke $y$ and alternately upon the end of the spool E, and the inner surface of the flange $w$, as the spool is moved forward and backward, acts as a brake on said parts and causes the yarn to be wound tightly on the spool. The spool is reciprocated by a cam G on shaft $k$, which engages the arm F, preferably through the medium of a friction-roll $g$.

To the revoluble head C, driven by belt $n$, is attached an arm $h'$, having an eye $i'$ in the end thereof and through which the wrapping thread or yarn $k'$ from the yarn-chain H passes, and in the head C is a passage $l'$, Fig. 5, for the yarn to cross to the inner side of the head, to which is attached arm $m'$, provided with a loop or eye $n'$, extending inward toward the spool E, and is provided with an eye $o'$ at its end. The yarn after having passed through the passage $l$ in head C passes through eye $n'$ on arm $m'$ and then through eye $o'$, from which it is wound upon the spool E as the head C, with its arms $h'$ and $m'$, is revolved upon tube D by belt $n$ and the spool reciprocated forward and backward by the cam G and intermediate connections. The chain of yarn passes through the tube D after the thread K' has been removed, and the yarn may then be conducted to a beamer or quilling-machine.

Having thus fully described my invention, what I claim is—

1. A machine for unwinding thread from a chain, consisting of a non-revoluble spool or receiver, means for reciprocating said spool, in combination with a revoluble head provided with arms extending from both sides thereof in opposite directions and having suitable eyes and a passage through said head for supporting and winding the thread upon the spool.

2. A machine for unwinding thread from a chain, consisting of a non-revoluble spool or receiver, a fixed tube supporting said spool, a revoluble head on said tube beyond the spool and provided with arms extending from both sides of the head in opposite directions, one toward the chain and the other toward the spool and having eyes through which the thread passes, and a passage through the head for supporting and winding the thread upon the spool, in combination with means for reciprocating said spool.

3. A machine for unwinding thread from a chain, consisting of a fixed tube, a non-revoluble reciprocatory spool or receiver supported on said tube, a revoluble head on the tube beyond the spool and provided with arms extending from both sides thereof in opposite directions, one toward the chain and the other toward the spool and having eyes through which the thread passes and a passage through the head for supporting and winding the thread upon the spool, in combination with a rod engaging the spool at one end, an arm or lever engaged by said rod at its opposite end and means for operating said arm.

4. A machine for unwinding thread from a chain, consisting of a fixed tube, a non-revoluble reciprocatory spool or receiver supported on said tube and having a flange at one end, a revoluble head on said tube provided with arms extending from both sides thereof in opposite directions, one toward the chain and the other toward the spool and a passage through the head for supporting and winding the thread upon the spool, in combination with a rod having a yoke at one end engaging the flange on the spool, an arm or lever to which said rod is connected, means for adjusting the length of said rod, means for applying friction to the spool through the medium of said yoke and means for operating said lever.

5. A machine for unwinding thread from a chain, consisting of a fixed tube, a non-revoluble reciprocatory spool supported on said tube, a revoluble head on the tube having a thread-passage therethrough and provided with suitable arms which revolve with the head for supporting and winding the thread upon the spool, a flange on one end of the spool, a rod having a yoke engaging the spool between one of its ends and said flange, a screw-thread at the opposite end of the rod, and an arm or lever to which said rod is adjustably connected, in combination with a cam for operating the lever and a spring connected to the lever and the frame of the machine for regulating tension of the wrapped thread on the spool.

In testimony whereof I affix my signature in presence of two witnesses.

ZEBULON H. MANGUM.

Witnesses:
H. PENNINGTON,
N. A. COX.